Figure 1:
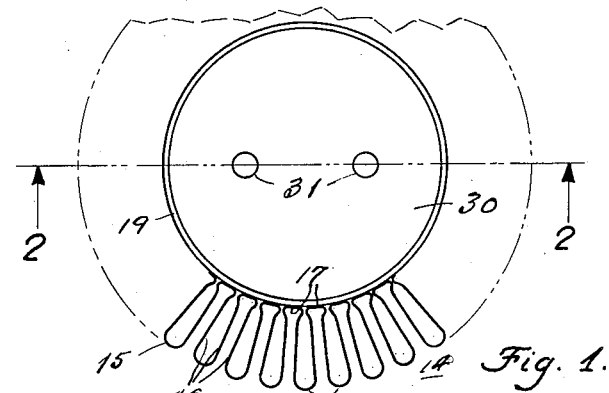

Nov. 15, 1927.

H. M. WILLIAMS 1,649,274

METHOD OF MAKING AIR COOLED CYLINDERS

Filed July 22, 1925

Inventor

H. M. Williams.
By Spencer, Sewall & Hardman,
his Attorneys.

Patented Nov. 15, 1927.

1,649,274

UNITED STATES PATENT OFFICE.

HARRY M. WILLIAMS, OF DAYTON, OHIO, ASSIGNOR TO GENERAL MOTORS RESEARCH CORPORATION, OF DAYTON, OHIO, A CORPORATION OF DELAWARE.

METHOD OF MAKING AIR-COOLED CYLINDERS.

Application filed July 22, 1925. Serial No. 45,286.

This invention relates to a method of integrally uniting different kinds of metals; and contemplates more particularly the manufacture of cast iron or other ferrous metal cylinders, having a head and heat-dissipating elements of a metal of higher heat conductivity.

An object of the invention is to integrally unite a head portion and fins of high heat conductivity, to a cast iron or other ferrous metal cylinder, so that the different metals will cohere and thus form a continuous molecular path for conducting heat away from the cylinder.

The invention consists in the combinations of steps more particularly set forth in the ensuing description and defined in the appended claims.

Figure 2:
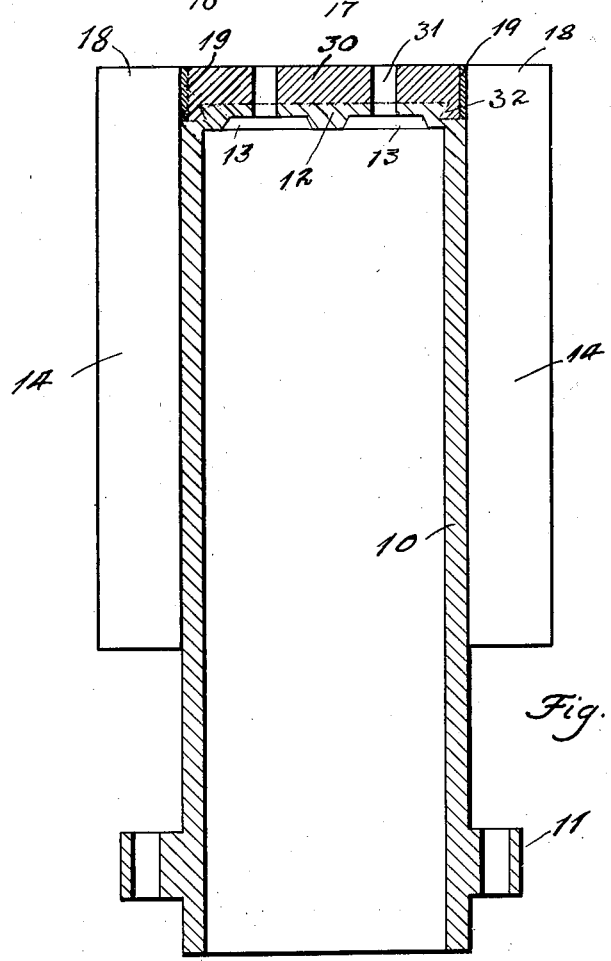

The drawing illustrates, somewhat diagrammatically, a cylinder made by the method of this application. In said drawings, in which like reference characters indicate like parts throughout the several views;

Fig. 1 is a top plan view of a cylinder made in accordance with the invention; and Fig. 2 is a vertical section on line 2—2 of Fig. 1.

Referring to the drawings, 10 represents a ferrous metal cylinder, for example, a cylinder of cast iron; 11 is a flange by which the cylinder may be bolted to the crankcase; 12 is the head end of the ferrous cylinder; and 13 represents the valve seats.

Integrally united to the outer surface of the cylinder 10, are fins 14, of good heat-conducting metal, such as copper. The fins are preferably formed on a continuous sheet of thin material, which is crimped or pleated, so as to form loops 15, the side walls 16 of which constitute the heat-dissipating fin elements. The base portions 17, connecting the fin loops, constitute an almost continuous layer of high-heat-conducting metal in juxtaposition with the outer surface of the cylinder. The finning structure 14 extends beyond the end 12 of the cylinder, as indicated at 18. A circular band 19 of any suitable material, such as copper, is fitted snugly against the inner edges of the fins, that is, in contact with the bases 17, where they extend beyond the head end 12. The finning structure 14 and the band 19 are integrally united by the following process:

The surface of the cylinder is first coated with a suitable flux, such as borax and boric acid. A thin sheet of brass, or other suitable bonding metal, is wrapped around the cylinder, with one edge projecting beyond the end 12 of the cylinder to an extent equal to that through which the finning structure will be extending beyond said end. A suitable flux is then applied to the outer side of the brazing sheet, or to the inner face of the bases 17 of the finning structure. The finning structure is then wrapped around the cylinder with the sheet of brazing structure and the flux suitably interposed. Or the brazing sheet and finning structure may be wrapped around the cylinder simultaneously. After the assembly has been temporarily fixed in the position desired, the band 19 is inserted within the space formed by the projecting finning structure and is pressed firmly into contact with the brazing sheet and finning structure, with, of course, suitable flux interposed. The band 19 may be snugly pressed into contact with the finning structure, if desired, by an expansive clamp, such as a ring of steel, inserted within said band. The entire assembly may be then suitably fluxed and heated in a furnace to a temperature sufficient to fuse the brazing metal and effect an integral bond between the finning structure, cylinder and the band 19. If the fins 18 are of copper and the brazing material is brass, the assembly should be heated to a red heat in the furnace. While the brazing is being effected, it is advisable to continuously rotate the assembly on a horizontal axis, in order that the brazing material may not drop off and may flow evenly to all parts of the joint.

After the brazing of the fins to the cylinder, and the brazing of the band 19 to the projecting ends of the fins, has been accomplished, the high-heat-conducting head portion 30 may be formed. The first step in forming the high-heat-conducting head portion 30 is to clean the surface within the cavity formed by the end portion 12 of the cylinder and the inner surface of the band 19. Suitable flux, such as zinc chloride, may then be applied to the surfaces, as by brushing, and a bonding metal containing phosphor tin, spread over said surfaces. The bonding metal may be applied by pouring it in a molten condition into the cavity, and then pouring off the excess, leaving a thin coating adhering to the surfaces. In case the head portion 30 is to be formed of aluminum or an aluminum alloy, the bonding metal may consist of lead and phosphor tin, in the proportions of about 98 parts of lead to 2 parts of phosphor tin. In case the high-heat-conducting head 20 is to be formed of copper, a small percentage of tin may be included in the bonding metal, so that the bonding metal will consist of, say, 90 parts of lead, 8 parts of tin and 2 parts of phosphor tin, more or less. When the surface has been thus prepared, molten metal of the kind desired to form the head, may be poured into the cavity formed between the end 12 of the cylinder and the dam formed by the band 19. The phosphor tin contained in the bonding metal has the property of "wetting" the metallic surfaces to which the bonding metal is applied, so that the entire surface will be covered with bonding metal. Therefore, when the high-heat-conducting metal has been cast in place it will be integrally united to the entire surface into contact with which it has been poured.

After the metal, which has been cast into contact with the end of the cylinder and the band 19, has cooled, the end of the cylinder may be machined so as to form a properly finished surface, and the valve stem openings 31 may be drilled.

In order to afford a firm mechanical anchorage for the high-heat-conducting portion 30, the end of the ferrous cylinder 10 on the exterior part 12 may be formed with an undercut groove 32, or other undercut anchorage, as illustrated in Fig. 1.

By the method described, a good metallic heat-conducting bond will be formed between the cast iron, or other ferrous metal cylinder, and the high-heat-conducting metals of the fins and head portion 30, so that an integral metallic path of very large extent is formed between the iron cylinder and the fins, and iron cylinder, high-heat-conducting head 30 and the fins.

While the form of embodiment of the invention as herein described, constitutes a preferred form, it is to be understood that other forms might be adopted, all coming within the scope of the claims which follow.

What is claimed is as follows:

1. The method of uniting relatively high-heat-conducting metal to ferrous metal, which consists in applying to the surface of the ferrous metal a bonding metal containing phosphor tin, and casting the high-heat-conducting metal onto said surface.

2. The method of uniting a layer of high-heat-conducting metal to a cylinder, which consists in forming a dam in the head end of the cylinder, applying a bonding metal to the surface within the dam, and casting the high-heat-conducting metal onto the cylinder within the dam.

3. The method of uniting high-heat-conducting metals to a ferrous cylinder, which consists in integrally uniting fins to said cylinder with their ends projecting beyond the head of the cylinder, simultaneously integrally uniting a band of thin metal to the inner edges of the projecting portions of said fins, thereafter applying a bonding metal to the surface of said band and the surface of the cylinder within said band, and then casting a high-heat-conducting metal into the cavity within said band.

4. The method of uniting high-heat-conducting metals to a ferrous cylinder, which consists in integrally uniting fins to said cylinder with their ends projecting beyond the head thereof, simultaneously integrally uniting a band of copper to the inner edges of the projecting portions of said fins, thereafter applying a bonding metal to the surface of said band and the surface of the cylinder within said band, then casting a high-heat-conducting metal into the cavity within said band.

5. The method of uniting high-heat-conducting elements to a ferrous cylinder, which consists in integrally uniting fins to said cylinder with their ends projecting beyond the head of the cylinder, simultaneously brazing a band of thin metal to the inner edges of the projecting portions of said fins, thereafter applying a bonding metal to the surface of said band and the surface of said cylinder within said band, and then casting a high-heat-conducting metal comprising aluminum into the cavity within said band.

6. The method of uniting high-heat-conducting metals to a ferrous cylinder, which consists in integrally uniting fins to said cylinder, with their ends projecting beyond the head thereof, simultaneously integrally uniting a band of copper to the inner edges of the projecting portions of said fins, thereafter applying a bonding metal containing phosphor tin to the surface of said band and the surface of said cylinder within said band, then casting a high-heat-conducting metal comprising aluminum into the cavity within said band.

7. The method of uniting high-heat-conducting metal to a cylinder, which consists in temporarily securing pins of high-heat-conducting metal to the cylinder, with their ends projecting beyond the head of said cylinder and with a thin sheet of bonding metal interposed between the fins and the surface of said cylinder, said bonding sheet extending in contact with the inner surface of said fins beyond the ends of the cylinder, pressing a band of metal into contact with the bonding sheet covering the inner edges of the projecting ends of said fins, heating the assembly to a temperature sufficient to effect an integral bond between the several parts of the assembly, thereafter applying a suitable bonding metal to the surfaces of the band and cylinder, and casting a high-heat-conducting metal into the cavity formed by said cylinder and band.

8. The method of uniting high-heat-conducting metal to a cylinder, which consists in temporarily securing fins of copper to the cylinder with the ends of said fins projecting beyond the head of the cylinder and with a thin sheet of bonding metal interposed between the cylinder and the fins and extending in contact with the inner edges of the fins projecting beyond the cylinder, pressing a copper band into contact with the bonding sheet covering the inner edges of the projecting ends of said fins, heating the entire assembly to a temperature sufficient to effect an integral union between the several parts of the assembly, then applying a suitable bonding metal to the surface of the band and cylinder within it and casting a high-heat-conducting metal into the cavity formed by said cylinder and band.

9. The method of uniting high-heat-conducting metal to a cylinder, which consists in temporarily securing fins of copper to the cylinder with the ends of said fins projecting beyond the head of the cylinder and with a thin sheet of bonding metal interposed between the cylinder and the fins and extending in contact with the inner edges of the fins projecting beyond the cylinder, pressing a copper band into contact with the bonding sheet covering the inner edges of the projecting ends of said fins, heating the entire assembly to a temperature sufficient to effect an integral union between the several parts of the assembly, then applying a bonding metal comprising lead and phosphor tin to the surfaces of the band and cylinder within it, and casting a high-heat-conducting metal into the cavity formed by said cylinder and band.

10. The method of uniting high-heat-conducting metal to a cylinder, which consists in temporarily securing fins of copper to the cylinder with the ends of said fins projecting beyond the head of the cylinder and with a thin sheet of bonding metal interposed between the cylinder and the fins and extending in contact with the inner edges of the fins projecting beyond the cylinder, pressing a copper band into contact with the bonding sheet covering the inner edges of the projecting ends of said fins, heating the entire assembly to a temperature sufficient to effect an integral union between the several parts of the assembly, then applying a bonding metal comprising lead and phosphor tin to the surfaces of the band and cylinder within, and casting a high-heat-conducting metal consisting of aluminum alloy into the cavity formed by said cylinder and band.

In testimony whereof I hereto affix my signature.

HARRY M. WILLIAMS.